No. 678,792. Patented July 16, 1901.
P. N. LUCAS GIRARDVILLE.
SHUT-OFF VALVE DEVICE FOR GAS PIPES AND NOZZLES.
(Application filed Apr. 22, 1901.)
(No Model.)
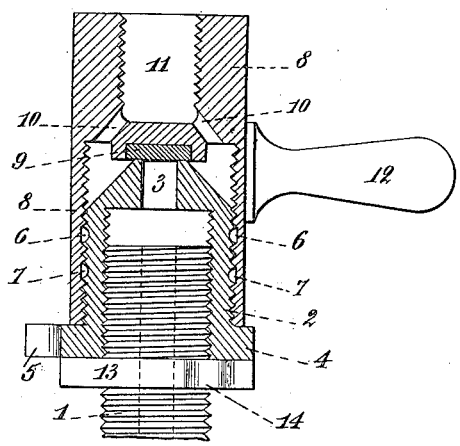

UNITED STATES PATENT OFFICE.

PAUL NICOLAS LUCAS GIRARDVILLE, OF PARIS, FRANCE.

SHUT-OFF VALVE DEVICE FOR GAS PIPES AND NOZZLES.

SPECIFICATION forming part of Letters Patent No. 678,792, dated July 16, 1901.

Application filed April 22, 1901. Serial No. 56,877. (No model.)

*To all whom it may concern:*

Be it known that I, PAUL NICOLAS LUCAS GIRARDVILLE, a citizen of the Republic of France, residing in the city of Paris, France, have invented a new and useful Improvement in Shut-Off Valve Devices for Gas Pipes and Nozzles, of which the following is a specification.

This invention relates to an improved construction of shut-off valve applicable to all kinds of gas pipes and nozzles.

It consists in the combination of a cylindrical cap having an externally-coned orifice, an inner screw-thread adapted to screw onto the thread of a gas pipe or nozzle, and an external screw-thread, a second cylindrical cap with internal screw-thread adapted to screw onto the outer thread of the first cap, a threaded opening at its upper end, the closed inner end of which has a recess on its under side filled with soft metal adapted to press upon and close the coned orifice of the first cap, and oblique passages adapted to allow the gas issuing from the coned orifice of the first cap to escape through the threaded opening of the second cap.

In order that the said invention may be readily understood, I will describe the same with reference to the accompanying drawing, which shows a vertical section of the improved shut-off valve device to an exaggerated scale.

1 is the threaded pipe or nozzle, such as is usual in any gaselier, bracket, or other illuminating device for the reception of the burner. Upon the thread of this piece is screwed an internally-threaded cap 2, the upper end of which is formed conical and has a central longitudinal orifice 3, while the lower end has an external flange 4, provided with a projection 5 for facilitating the screwing on thereof on the pipe 1. On the outer surface of the cap 2 is formed a screw-thread in which are formed annular grooves or gaps 6 and 7, for a purpose to be presently mentioned. On the cap 2 is screwed a second cylindrical cap 8, near the upper end of which is a partition containing a recess 9, which is filled with soft metal, such as solder, which serves as valve for closing the orifice 3 of the cap 2. On opposite sides of the recess 9 are oblique passages 10 for conveying the gas from the orifice 3 when the valve is open into the internally-threaded opening 11 at the upper end of cap 8, into which is screwed the burner or nipple of the gas-jet. The upper groove 6 is filled with grease that may be made semifluid by mixing therewith a small quantity of vaseline or the like, thereby forming a close joint and also acting as a lubricant for enabling the upper cap to turn readily on the lower one. The lower groove 7, on the other hand, is filled with a packing of stiff grease or other suitable substance, such as red lead, that will prevent the leakage past it of any of the semiliquid grease from groove 6.

For shutting off the gas-supply to the burner the cap 8 is turned upon the cap 2 so as to bring the soft-metal valve 9 close down upon the conical orifice 3 and to thus cut off the supply of gas to the channels 10.

The turning of cap 8 can be facilitated by providing it with a handle or stud, such as 12, which at the same time serves as an index to show by its relative position whether the valve is open or closed.

In consequence of the continued pressure of the soft-metal valve 9 upon the conical orifice there will after a time take place a displacement of the soft metal, with the result that by degrees the handle 12 will shift from its initial relative position which indicates the complete closure of the valve, and consequently its other positions will also no longer indicate the same degrees of opening of the valve. In order to remedy this inconvenience, it suffices to screw the two caps 2 and 8 a little higher up on the pipe 1, so that by this slight turning motion the handle 12 will be brought back to its initial position relative to the other parts. It is requisite in this case to prevent any leakage of gas that might occur between the screw-threads of the parts 1 and 2, and for this purpose I provide on the pipe 1 a separate internally-threaded collar 13, screwed onto the thread of pipe 1 and provided with a lug 14 for conveniently turning it upon the pipe, which collar is screwed up tight against the base 4 of cap 2 with the interposition of a suitable gas-tight packing material, such as red lead.

Having thus described the nature of this invention and the best means I know of carrying the same into practical effect, I claim—

A shut-off valve device for gas pipes, nozzles and the like consisting of the combination of a cylindrical cap having an externally-coned orifice, an inner screw-thread adapted to screw onto the external thread of a gas-supply pipe or nozzle and an external screw-thread, a second cylindrical cap with internal screw-thread at its lower part adapted to screw onto the external thread of the first cap, an internally-threaded opening at its upper part the closed inner end of which has on its under side a recess filled with soft metal and constituting a valve closing the coned orifice of the first cap, and oblique passages on each side of said valve adapted to conduct the gas issuing from the said coned orifice when open, into the threaded opening at top for the supply of the burner substantially as described.

In testimony that I claim the foregoing as my invention I have signed my name in presence of two subscribing witnesses.

PAUL NICOLAS LUCAS GIRARDVILLE.

Witnesses:
EDWARD P. MacLEAN,
JULES FAYOLLET.